US010865910B1

(12) United States Patent
Allen et al.

(10) Patent No.: US 10,865,910 B1
(45) Date of Patent: Dec. 15, 2020

(54) COUPLED FAIRING SYSTEMS

(71) Applicant: VIV Solutions LLC, Richmond, TX (US)

(72) Inventors: Donald Wayne Allen, Richmond, TX (US); Julie Ann Dehne, Cypress, TX (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 15/099,471

(22) Filed: Apr. 14, 2016

Related U.S. Application Data

(60) Provisional application No. 62/149,421, filed on Apr. 17, 2015.

(51) Int. Cl.
*F16L 1/12* (2006.01)
*F15D 1/10* (2006.01)
*H02G 7/00* (2006.01)
*E21B 17/01* (2006.01)
*B63B 21/50* (2006.01)

(52) U.S. Cl.
CPC ............ *F16L 1/123* (2013.01); *B63B 21/502* (2013.01); *E21B 17/017* (2013.01); *F15D 1/10* (2013.01); *B63B 2021/504* (2013.01)

(58) Field of Classification Search
CPC ....... F16L 1/123; F15D 1/10; B63B 2021/504
USPC .................. 114/243; 405/211, 216
See application file for complete search history.

(56) References Cited

U.S. PATENT DOCUMENTS

| | | | | |
|---|---|---|---|---|
| 879,586 | A | * 2/1908 | Reynolds | ................ H02G 7/10 248/61 |
| 890,125 | A | * 6/1908 | Crampton | ................ H02G 7/10 24/339 |
| 2,401,783 | A | * 6/1946 | Wilcoxon | ............. B63B 21/663 114/243 |
| 3,163,221 | A | 12/1964 | Shatto, Jr. | |
| 3,176,646 | A | * 4/1965 | Natwick | ............... B63B 21/663 114/243 |
| 3,194,204 | A | * 7/1965 | Nichols | ................. B63B 21/663 114/243 |
| 3,248,886 | A | 5/1966 | Blenkarn | |

(Continued)

FOREIGN PATENT DOCUMENTS

| | | |
|---|---|---|
| EP | 2525123 | 11/2012 |
| GB | 2335248 | 9/1999 |

(Continued)

OTHER PUBLICATIONS

VIV Solutions, Non-final Office Action dated Aug. 21, 2012 for U.S. Appl. No. 13/274,207, 7 pages.

(Continued)

*Primary Examiner* — Tara Mayo-Pinnock
(74) *Attorney, Agent, or Firm* — Womble Bond Dickinson (US) LLP

(57) ABSTRACT

A vortex-induced vibration (VIV) suppression device including a body portion dimensioned to encircle an underlying tubular and a tail portion extending laterally outward from the body portion, the tail portion having a top end and a bottom end. The device further including an engaging member positioned at least at the top end or the bottom end of the body portion or the tail portion. The engaging member may be dimensioned to engage with an adjacent VIV suppression device.

19 Claims, 11 Drawing Sheets

(56) References Cited

U.S. PATENT DOCUMENTS

| | | | |
|---|---|---|---|
| 3,321,924 A | | 5/1967 | Liddell |
| 3,343,515 A | * | 9/1967 | Nichols ................ B63B 21/663 |
| | | | 114/243 |
| 3,454,051 A | | 7/1969 | Goepfert et al. |
| 3,472,196 A | | 10/1969 | Ewing et al. |
| 3,557,840 A | | 1/1971 | Maybee |
| 3,611,976 A | * | 10/1971 | Hale ...................... H01B 7/045 |
| | | | 114/243 |
| 3,962,982 A | * | 6/1976 | Marchay ............... B63B 21/663 |
| | | | 114/243 |
| 4,033,279 A | * | 7/1977 | Stiles .................... B63B 21/663 |
| | | | 114/243 |
| 4,116,015 A | | 9/1978 | Duncan |
| 4,365,574 A | | 12/1982 | Norminton |
| 4,398,487 A | | 8/1983 | Ortloff et al. |
| 4,474,129 A | | 10/1984 | Watkins et al. |
| 4,505,617 A | | 3/1985 | Miller et al. |
| 4,567,841 A | | 2/1986 | Hale |
| 4,657,116 A | | 4/1987 | Gardner et al. |
| 4,700,651 A | * | 10/1987 | Hale ..................... B63B 21/663 |
| | | | 114/243 |
| 4,705,331 A | | 11/1987 | Britton |
| 4,832,530 A | | 5/1989 | Andersen et al. |
| 5,050,445 A | * | 9/1991 | Duffy ................... B63B 21/663 |
| | | | 74/502.3 |
| 5,335,620 A | * | 8/1994 | Small .................... B63B 21/663 |
| | | | 114/243 |
| 5,421,413 A | | 6/1995 | Allen et al. |
| 5,456,199 A | * | 10/1995 | Kernkamp ................ B63B 1/32 |
| | | | 114/111 |
| 5,722,340 A | * | 3/1998 | Sweetman ................ F15D 1/10 |
| | | | 114/243 |
| 5,845,827 A | * | 12/1998 | Reising ..................... B60R 9/05 |
| | | | 224/316 |
| 5,869,159 A | | 2/1999 | Padilla |
| 6,019,549 A | | 2/2000 | Blair et al. |
| 6,048,136 A | | 4/2000 | Denison et al. |
| 6,067,922 A | * | 5/2000 | Denison ................ B63B 21/663 |
| | | | 114/243 |
| 6,347,911 B1 | | 2/2002 | Blair et al. |
| 6,401,646 B1 | | 6/2002 | Masters et al. |
| 6,561,734 B1 | | 5/2003 | Allen et al. |
| 6,565,287 B2 | | 5/2003 | McMillan et al. |
| 6,685,394 B1 | | 2/2004 | Allen et al. |
| 6,695,539 B2 | | 2/2004 | McMillan et al. |
| 6,695,540 B1 | | 2/2004 | Taquino |
| 6,702,026 B2 | | 3/2004 | Allen et al. |
| 6,755,595 B2 | | 6/2004 | Oram |
| 6,789,578 B2 | | 9/2004 | Latham et al. |
| 6,896,447 B1 | | 5/2005 | Taquino |
| 6,928,709 B2 | | 8/2005 | McMillan et al. |
| 6,971,413 B2 | | 12/2005 | Taylor et al. |
| 6,994,492 B2 | | 2/2006 | McMillan et al. |
| 7,017,666 B1 | | 3/2006 | Allen et al. |
| 7,070,361 B2 | * | 7/2006 | McMillan ............... E21B 17/01 |
| | | | 114/243 |
| 7,458,752 B2 | | 12/2008 | Esselbrugge et al. |
| 7,485,801 B1 | | 2/2009 | Pulter et al. |
| 7,578,038 B2 | | 8/2009 | McMillan et al. |
| 7,600,945 B2 | | 10/2009 | Burgess |
| 7,674,074 B2 | | 3/2010 | Masters et al. |
| 7,766,580 B2 | | 8/2010 | Dartford et al. |
| 7,842,396 B2 | | 11/2010 | White |
| 8,297,883 B2 | | 10/2012 | Masters et al. |
| 8,511,245 B2 | | 8/2013 | Dehne et al. |
| 8,622,657 B2 | | 1/2014 | Masters et al. |
| 8,770,894 B1 | | 7/2014 | Allen et al. |
| 8,851,005 B2 | * | 10/2014 | Tonchia .................... G01V 1/38 |
| | | | 114/243 |
| 8,944,722 B1 | | 2/2015 | Allen et al. |
| 9,511,825 B1 | | 12/2016 | Henning et al. |
| 9,523,247 B1 | | 12/2016 | Allen et al. |
| 9,523,456 B1 | | 12/2016 | Allen et al. |
| 2002/0074133 A1 | | 6/2002 | McMillan et al. |
| 2003/0074777 A1 | | 4/2003 | McMillan et al. |
| 2004/0013473 A1 | | 1/2004 | Gibson |
| 2004/0175240 A1 | * | 9/2004 | McMillan et al. ...... E21B 17/01 |
| | | | 405/211 |
| 2005/0082730 A1 | | 4/2005 | Murray et al. |
| 2005/0141967 A1 | | 6/2005 | Giles et al. |
| 2005/0254903 A1 | * | 11/2005 | McMillan et al. ........ F16L 1/20 |
| | | | 405/216 |
| 2006/0153642 A1 | | 7/2006 | Esselbrugge et al. |
| 2006/0280559 A1 | | 12/2006 | Allen et al. |
| 2007/0140797 A1 | | 6/2007 | Armstrong |
| 2007/0296229 A1 | | 12/2007 | Chauvin et al. |
| 2008/0025800 A1 | | 1/2008 | Watkins |
| 2008/0050181 A1 | | 2/2008 | Masters et al. |
| 2008/0236469 A1 | | 10/2008 | Masters et al. |
| 2009/0076529 A1 | | 3/2009 | Ganti |
| 2009/0185867 A1 | | 7/2009 | Masters et al. |
| 2009/0185868 A1 | | 7/2009 | Masters et al. |
| 2009/0252559 A1 | | 10/2009 | Masters et al. |
| 2010/0129159 A1 | * | 5/2010 | Brown ..................... E21B 17/01 |
| | | | 405/211 |
| 2010/0156088 A1 | | 6/2010 | Masters et al. |
| 2010/0181064 A1 | | 7/2010 | Knobloch et al. |
| 2010/0215440 A1 | | 8/2010 | Wajnikonis |
| 2011/0200396 A1 | | 8/2011 | Allen et al. |
| 2012/0291687 A1 | | 11/2012 | Dehne et al. |
| 2013/0014685 A1 | | 1/2013 | Tonchia |
| 2013/0039702 A1 | * | 2/2013 | West ........................ F15D 1/10 |
| | | | 405/216 |
| 2013/0064607 A1 | | 3/2013 | Masters et al. |
| 2015/0086276 A1 | | 3/2015 | Harbison et al. |

FOREIGN PATENT DOCUMENTS

| | | | | |
|---|---|---|---|---|
| GB | 2362444 | | 11/2001 | |
| WO | WO-2005026560 | | 3/2005 | |
| WO | WO2008/064102 A2 | | 5/2008 | |
| WO | WO 2008064102 A2 | * | 5/2008 | ........... B63B 39/005 |
| WO | WO-2009070483 | | 6/2009 | |
| WO | WO2011/022332 A1 | | 2/2011 | |
| WO | WO 2011022332 A1 | * | 2/2011 | ........... E21B 17/012 |

OTHER PUBLICATIONS

VIV Solutions LLC, European search report dated Sep. 26, 2012 for EP Appln. No. 12168141.5.
Final Office Action dated Nov. 17, 2015, U.S. Appl. No. 13/841,720.
Final Office Action dated Dec. 15, 2016, U.S. Appl. No. 13/841,720.
Final Office Action dated Jul. 15, 2015, U.S. Appl. No. 13/343,408.
Final Office Action dated Sep. 7, 2016, U.S. Appl. No. 13/343,408.
Final Office Action dated Sep. 4, 2014, U.S. Appl. No. 13/343,408.
Non-final Office Action dated Mar. 27, 2014, U.S. Appl. No. 13/725,077.
Non-final Office Action dated Mar. 9, 2016, U.S. Appl. No. 13/343,408.
Non-final Office Action dated Apr. 9, 2014, U.S. Appl. No. 13/343,408.
Non-Final Office Action dated May 13, 2015, U.S. Appl. No. 13/841,720.
Allen, D. W. et al., "Henning Devices: A new class of VIV suppression apparatus for offshore tubulars", Offshore Technology Conference 19881, 2009, 1-9.
Lee, L. et al., "Blade henning devices for VIV suppression of offshore tubulars", Proceedings of OMAE: 28th International Conference on Ocean, Offshore and Arctic Engineering, Shell Global Solutions (US) Inc., 2009, 1-6.
VIV Solutions LLC, Final Office Action dated Jul. 27, 2016, U.S. Appl. No. 14/293,775.
VIV Solutions LLC, Final Office Action dated Dec. 8, 2015, U.S. Appl. No. 13/706,209.
VIV Solutions LLC, Non-Final Office Action dated Apr. 7, 2016, U.S. Appl. No. 14/293,775.
VIV Solutions LLC, Non-Final Office Action dated Oct. 4, 2017, U.S. Appl. No. 15/447,011.
VIV Solutions LLC, Non-Final Office Action dated Apr. 30, 2018, U.S. Appl. No. 15/447,011.

(56) References Cited

OTHER PUBLICATIONS

VIV Solutions LLC, Non-Final Office Action dated Apr. 5, 2017, U.S. Appl. No. 13/841,720.
VIV Solutions LLC, Non-Final Office Action dated May 5, 2015, U.S. Appl. No. 13/706,209.
VIV Solutions LLC, Non-Final Office Action dated Jul. 7, 2017, U.S. Appl. No. 13/841,720.
Non-Final Office Action, dated Jun. 22, 2018, for U.S. Appl. No. 15/633,594.

* cited by examiner

COUPLED FAIRING SYSTEMS

CROSS-REFERENCE TO RELATED APPLICATION

The application is a non-provisional application of U.S. Provisional Patent Application No. 62/149,421, filed Apr. 17, 2015 and incorporated herein by reference.

FIELD

Systems and devices for restraining or aligning adjacent fairings and suppressing marine growth between the fairings while still allowing for small movements of the fairings relative to each other. Other embodiments are also described herein.

BACKGROUND

A difficult obstacle associated with the exploration and production of oil and gas is management of significant ocean currents. These currents can produce vortex-induced vibration (VIV) and/or large deflections of tubulars associated with drilling and production. VIV can cause substantial fatigue damage to the tubular or cause suspension of drilling due to increased deflections. Both helical strakes and fairings can provide sufficient VIV suppression.

Fairings are a popular VIV suppression device. Fairings are usually separated by collars. The collars are clamped tight to the underlying pipe or tubular while the fairings are free to rotate. The collars restrain the fairings from sliding up or down or along the tubular axially.

In areas of potential marine growth, copper or other anti-fouling coatings or materials are used on one or more of the collar surfaces that face adjacent fairings to prevent marine growth from growing on this bearing surface and potentially causing the fairing to lock into position. If a fairing cannot weathervane due to being locked into position, its performance can suffer considerably even to the point where the vibration is increased and not suppressed. A locked fairing can also result in a substantial increase in drag forces on the tubular.

Presently, in areas of relatively high marine growth, a collar with copper is always used on surfaces that are adjacent to fairings. Thus, at least one collar is required for every fairing. While this works fairly well for many tubulars, for larger tubulars the density of collars relative to the tubular diameter is too high. This is because it is impractical to make fairings tall enough to maintain the same collar density for a larger tubular as for a smaller tubular. If multiple fairings are used for each collar by simply removing collars (e.g., removing every other collar in a series), there is the possibility that two adjacent fairings could be locked in an undesirable position relative to each other due to marine growth.

For areas where marine growth is less of a concern, there is the possibility of simply using more than one fairing for every collar without the worry of marine growth locking the fairings relative to each other. However, there may still be a desire to restrain adjacent fairings together in order prevent locking of adjacent fairings should unexpected marine growth levels be experienced.

One option is to mechanically lock adjacent fairings together. The problem with this approach is that the vortex shedding from the fairing is now relatively long (correlated). This can reduce the fairing efficiency for some flow situations. Ideally, the adjacent fairings move together but with some small freedom to move relative to each other, and without the possibility of marine growth locking them up at a large angle relative to each other.

SUMMARY

The present invention consists of methods for restraining or aligning adjacent fairings including methods that suppress marine growth between the fairings and methods that allow for small movements of the fairings relative to each other. In some embodiments, the invention is directed to a mechanism or device to restrain or align adjacent fairings. In some embodiments, the mechanism or device restrains or aligns adjacent fairings while still allowing some small motion of the fairings relative to each other. In some embodiments, the mechanism or device also inhibits marine growth between the adjacent fairings. In some embodiments, the mechanism or device increases fairing density along a tubular by utilizing fewer collars. The mechanism may be less expensive and/or faster to manufacture and/or install than the typical one-fairing-per-collar arrangement.

A vortex-induced vibration (VIV) suppression device including a body portion and a tail portion. The body portion may be dimensioned to encircle an underlying tubular. The tail portion may extend laterally outward from the body portion and have a top end and a bottom end. The body portion may have any size and shape suitable for holding the tail portion against an underlying tubular. For example, the body portion may be a sleeve like member that extends along substantially along the length of the body portion and an underlying tubular, and circumferentially around the underlying tubular. Alternatively, the body portion may be a strap or band that encircles the tubular and is attached at opposing ends to opposite sides of the tail portion. The device may further include an engaging member positioned at least at the top end or the bottom end of the tail portion. The engaging member may be dimensioned to engage with an adjacent VIV suppression device. In one embodiment, the engaging member may be an attachment member that extends from one of the top end or the bottom end of the tail portion. Still further, the engaging member may be a protrusion having a length dimension substantially parallel to a longitudinal axis of the body portion. In some embodiments, the engaging member may be a block attached to the top end or the bottom end and have a laterally extending opening formed entirely through the block. In other embodiments, the engaging member may be a recessed region formed inwardly from the bottom edge of the tail portion. Still further, the engaging member may be a receiving member formed within the tail portion, wherein the receiving member comprises a bottom surface and a sidewall extending from the bottom surface to the bottom end of the tail portion to form an opening in the bottom end. In addition, the engaging member may be a laterally extending channel formed through the tail portion. Still further, the engaging member may be a bar that extends from the top end or the bottom end of the tail portion to an adjacent VIV suppression device, and an end of the bar is positioned on, and attached to, the adjacent VIV suppression device. The VIV suppression device may also include a copper plate formed along one of the top end or the bottom end of the tail portion. The VIV suppression device may also include a support block positioned within the tail portion, and adjacent to the top end or the bottom end. In some embodiments, the engaging member is a first engaging member positioned at the top end of the tail portion and the device further includes a second engaging member positioned at the bottom end of the tail portion.

In other embodiments, the invention is directed to a system for suppressing a vortex-induced vibration (VIV) of a tubular. The system may include a VIV suppression device having a top end and a bottom end, a first engaging member positioned at the top end and a second engaging member positioned at the bottom end. The first engaging member may be different than the second engaging member, and the first engaging member and the second engaging member may be dimensioned to engage with an adjacent VIV suppression device. In some embodiments, the VIV suppression device may be a fairing including a cylindrical body portion dimensioned to encircle an underlying tubular and a tail portion extending laterally outward from the body portion. In one embodiment, the first engaging member is a protrusion extending from the top end and the second engaging member is a recessed region formed inwardly from the bottom end. In some cases, at least one of the first engaging member or the second engaging member is a laterally extending opening formed through the VIV suppression device, and the laterally extending opening is dimensioned to receive a cable for attaching the VIV suppression device to an adjacent VIV suppression device. The system may further include a support block positioned within the VIV suppression device near the top end, and the first engaging member may be a protrusion extending from the support block. The system may further include a plate positioned over the top end or the bottom end of the VIV suppression device and the plate may provide a bearing surface for an adjacent VIV suppression device. Still further, a marine growth suppression plate may be positioned on the top end or the bottom end of the VIV suppression device. In some embodiments, a copper ring is positioned on the top end or the bottom end of the VIV suppression device. The copper ring may include a first ring section and a second ring section, and the first ring section and the second ring section may be movably attached together by a hinge.

The above summary does not include an exhaustive list of all aspects of the present invention. It is contemplated that the invention includes all apparatuses that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
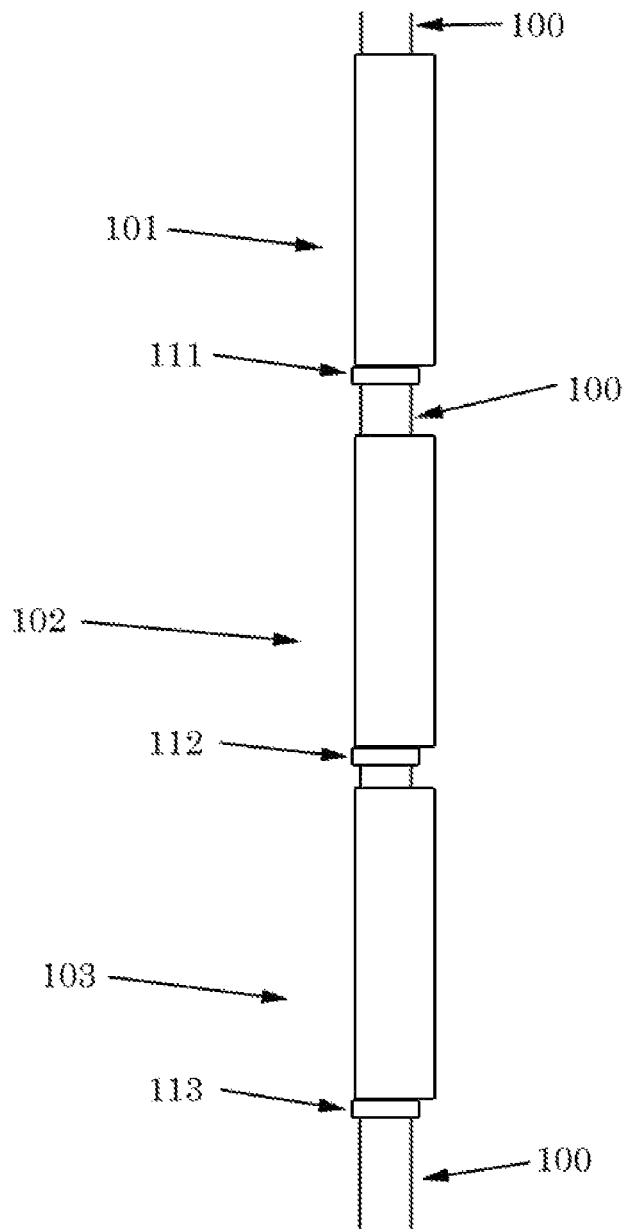
FIG. 1A illustrates a side view of one embodiment of VIV suppression devices and collars on a tubular with a collar between each VIV suppression device.

Referring now to the invention in more detail, FIG. 1A presents VIV suppression devices 101, 102, and 103 and collars 111, 112, and 113 surrounding tubular 100. VIV suppression devices 101, 102, and 103 may, in one embodiment, be fairings having, for example, a cylindrical body portion and a substantially triangular shaped tail, which is dimensioned to suppress VIV about tubular 100 by streamlining the current flow past the tubular. The fairings may have, for example, a clam-shell configuration such that they can be opened and closed around the tubulars. It is to be understood, however, that although a fairing is illustrated, the VIV suppression devices 101, 102, and 103 may be any other type of device suitable for suppressing VIV about tubular 100, for example, a helical strake, a henning device, a cylindrical or other shaped sleeve, or the like, or a combination of these devices.

Collars 111, 112, and 113 may be positioned between VIV suppression devices 101, 102 and 103 to help position the devices at the desired axial location. Collars 111, 112, and 113 may have a height which is less than that of the associated VIV suppression device, for example, a height which is less than 50 percent of the height of the VIV suppression device, or less than 25 percent a height of the VIV suppression device or less than ⅛ a height of the VIV suppression device. Representatively, collars 111, 112, and 113 may have a height of from about 1 inch to about 6 inches, for example, from about 2 inches to about 5 inches, or from 3 inches to 4 inches. In other words, collars 111, 112, and 113 are not intended to cover more of the tubular 100 than VIV suppression devices 101, 102, 103, rather they cover only a small portion of the tubular length which is exposed between VIV suppression devices positioned along tubular 100.

Collars 111, 112, and 113 may include annular or ring shaped body portions formed by one continuous structure or, in some embodiments, formed by segments, which when connected form a ring around tubular 100. Collars 111, 112, and 113 may further include attachment members that are used to attach the collars around tubular 100. For example, collars 111, 112, and 113 may include bolts, clamps, hinges or other fasteners can be used to attach adjacent ring segments together.

Collars 111, 112, and 113 are clamped tightly to tubular 100 while VIV suppression devices 101, 102, and 103 (e.g., fairings) are free to rotate around tubular 100. VIV suppression devices 101, 102, and 103 may be made of any suitable shape or material. Collars 111, 112, and 113 may be made of any suitable shape or material. Tubular 100 may be made of any suitable shape or material.

Figure 1B:
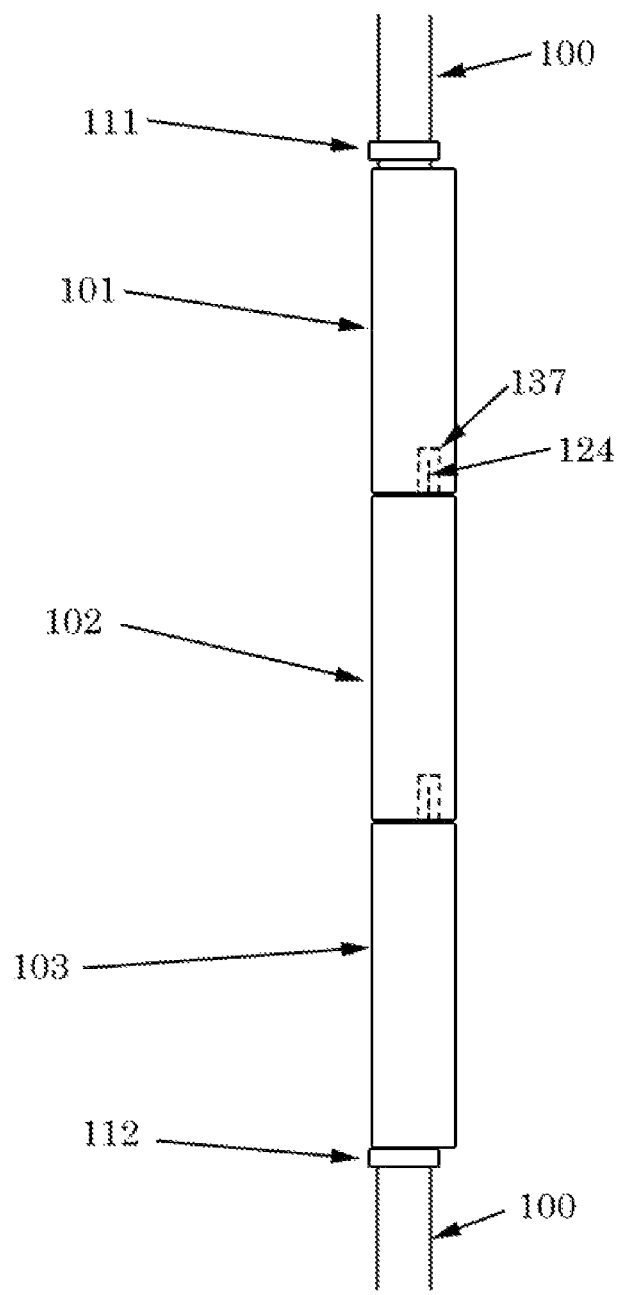
FIG. 1B illustrates a side view of one embodiment of VIV suppression devices and collars on a tubular with more than one VIV suppression device between a pair of collars.

Referring now to FIG. 1B, VIV suppression devices 101, 102, and 103 are shown adjacent to each other and surrounded by collars 111 and 112. Tubular 100 is under VIV suppression devices 101, 102, and 103 and collars 111 and 112.

Again referring to FIG. 1B, VIV suppression devices 101, 102, and 103 are free to rotate around tubular 100 while collars 111 and 112 are clamped to tubular 100. One or more VIV suppression devices 101, 102, and 103 may also be attached to each other at their ends. VIV suppression devices 101, 102, and 103 may be connected by any suitable means including, but not limited to, clamps, blocks, fasteners, pins, chemical bonding, rope, cable, or cable ties. In one embodiment, VIV suppression devices 101, 102, and 103 may be attached by an attachment member 124 extending from one end of one device, that is received within a receiving member 137 of another adjacent device, as will be discussed in more detail in reference to FIG. 2A-2D.

Figure 2A:
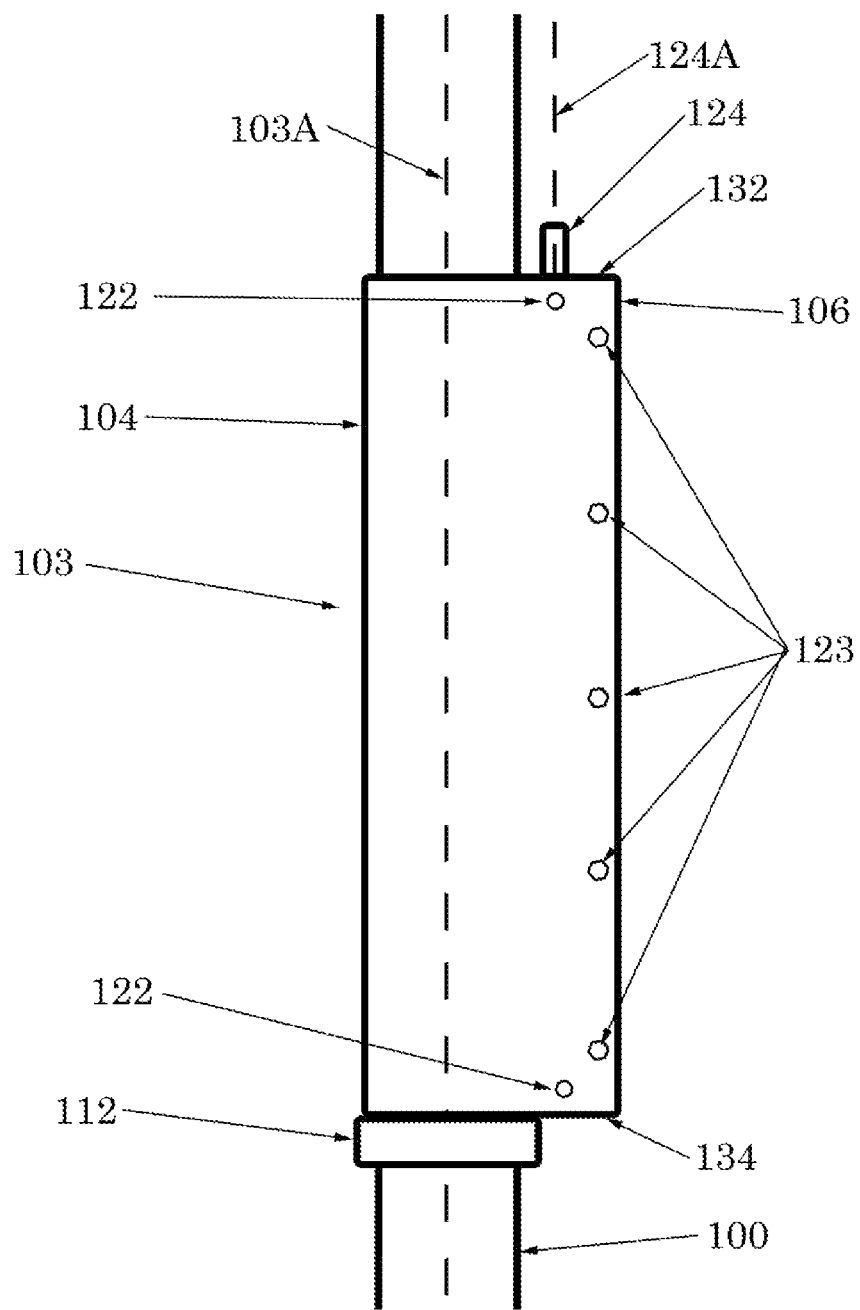
FIG. 2A illustrates a side view of one embodiment of a VIV suppression device with an attachment member for engaging an adjacent VIV suppression device.

Referring now to FIG. 2A, FIG. 2A illustrates one embodiment of a VIV suppression device having an engaging member for attaching the VIV suppression device to another VIV suppression device. VIV suppression device 103 is shown sitting on collar 112 over underlying tubular 100. VIV suppression device 103 may be a fairing having a body portion 104 dimensioned to encircle tubular 100 and a tail portion 106 extending laterally outward from the body portion 104 (away from tubular 100). Tail fasteners 123 connect opposing sides of tail portion 106 of VIV suppression device 103 to itself after it is placed around tubular 100. Block fasteners 122 connect underlying support blocks (see FIG. 2B) to device 103. VIV suppression device 103 may include an engaging member, for example in this embodiment, the engaging member is an attachment member 124 extending from its top edge, parallel to its longitudinal axis, for attaching device 103 to an adjacent VIV suppression device (e.g., device 101 or 102). Attachment member 124 may be a male piece which is attached to a support block within device 103, or a wall of device 103 itself. In other embodiments, the engaging member may be a female piece formed at an end of VIV suppression device 103, as will be described in more detail in reference to FIG. 2D.

Again referring to FIG. 2A, attachment member 124 is used to mate with another engaging member, for example, a receiving member (e.g., a female piece) of an adjacent VIV suppression device (not shown). Attachment member 124 may be of any suitable shape or size and may connect to any part of VIV suppression device 103. Representatively, in one embodiment, VIV suppression device 103 includes a top end 132 and a bottom end 134, and attachment member 124 is connected at a top end 132 or bottom end 134 of device 103. Attachment member 124 may be made of any suitable material including, but not limited to, plastic, metal (including copper), fiberglass, wood, rubber, or elastomer. Attachment member 124 may include more than one component. For example, all or part of attachment member 124 may consist of a rubber, elastomer, or other spring material/device which would allow the adjacent VIV suppression devices to move relative to VIV suppression device 103. Multiple attachment members 124 may also be present. Attachment member 124 can be oriented in the upward position on the top end 132 of the VIV suppression device 103 or in the downward position on the bottom end 134 of the VIV suppression device 103. Representatively, in one embodiment attachment member 124 is a protruding member having a length dimension 124A that is substantially parallel to a longitudinal axis 103A of VIV suppression device 103. It should be understood, however, that although attachment member 124 is shown in this embodiment extending from the top edge of the tail portion 106 of device 103, it may extend from a rib or other member outside of device 103, so long as it is still operable to engage device 103 with a receiving member of an adjacent device.

Figure 2B:
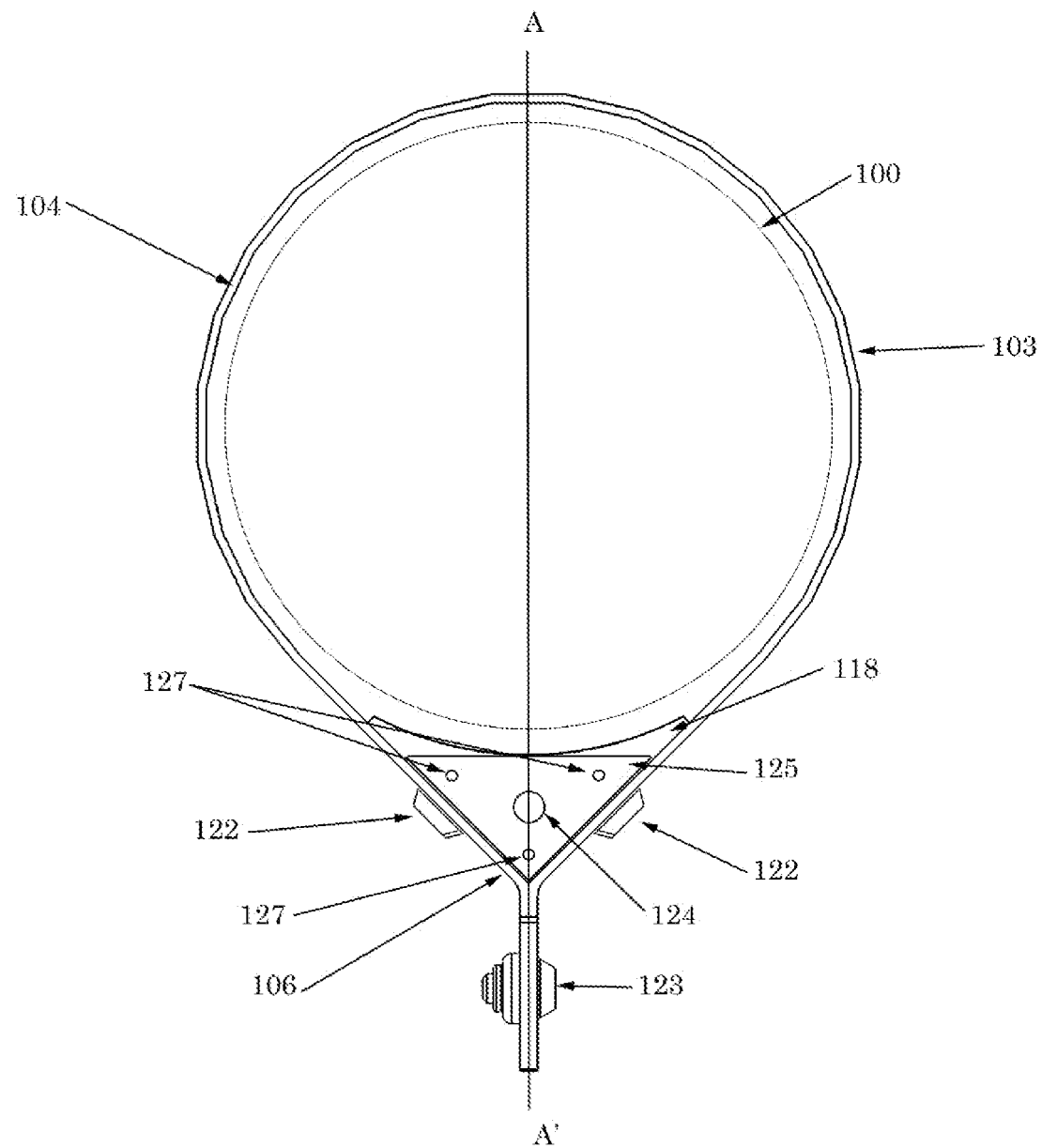
FIG. 2B illustrates a top end view of the VIV suppression device of FIG. 2A.

Referring now to FIG. 2B, this figure shows an end view of one embodiment of the VIV suppression device of FIG. 2A. From this view, it can be seen that VIV suppression device 103 includes a cylindrical body portion 104 surrounding tubular 100, which terminates at a substantially triangular shaped tail portion 106. Both the cylindrical body portion 104 and the tail portion 106 may be formed by one integrally formed wall of VIV suppression device 103. Alternatively, body portion 104 may be a clamshell type configuration with sides that are hinged together at one end, and fastened at the other end, once body portion 104 is positioned around tubular 100. Support block 118 may be attached to VIV suppression device 103 using block fasteners 122 or other means. Tail fasteners 123 connect the sides of VIV suppression device 103 to itself after it is closed around tubular 100. In one embodiment, a copper plate 125 is attached to support block 118 by plate fasteners 127. Attachment member 124 may extend from copper plate 125 (in a direction perpendicular to a surface of copper plate 125).

Again referring to FIG. 2B, support block 118 may be used to give strength to VIV suppression device 103. Copper plate 125 may act as a bearing surface for an adjacent VIV suppression device and suppresses marine growth on the bearing surface. Attachment member 124 extends above copper plate 125 to mate with a corresponding female piece of an adjacent VIV suppression device. Attachment member 124 may be attached to copper plate 125 by any suitable means including fastening or welding, or it may be integral to copper plate 125. Attachment member 124 may pass through all or part of support block 118. Attachment member 124 may be of any suitable size or shape and more than one attachment member 124 may be used (each male piece may be identical or may be different from each other). Copper plate 125 may be of any suitable size or shape and any number of plate fasteners 127 may be used to attach it to support block 118. Copper plate 125 may be used as both a support block and other structure in addition to its antifouling function.

Figure 2C:
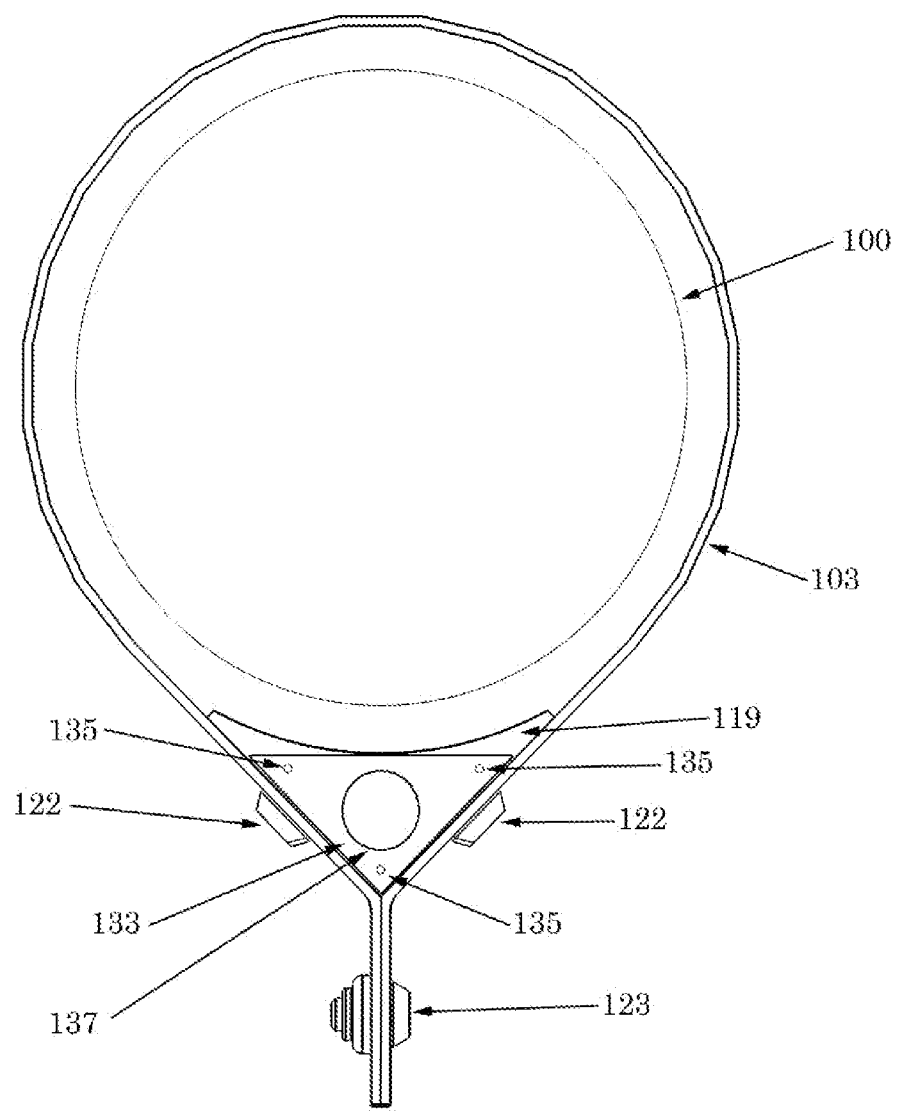
FIG. 2C illustrates a bottom end view of the VIV suppression device of FIG. 2A.

Referring now to FIG. 2C, FIG. 2C shows an end view of an embodiment of the VIV suppression device of FIG. 2A. The end view may be the opposite end of VIV suppression device 103 that is shown in FIG. 2B, or an alternative configuration for the VIV suppression device end shown in FIG. 2B. VIV suppression device 103 is shown surrounding tubular 100. Support block 119 is attached to VIV suppression device 103 using block fasteners 122. In cases where VIV suppression device 103 is a fairing, tail fasteners 123 connect the sides of the fairing to itself after it is closed around tubular 100. A copper plate 133 may be connected to support block 119 by plate fasteners 135. In this embodiment, a receiving member 137 for receiving an attachment member (e.g., a male fastener) from an adjacent VIV suppression device is formed in copper plate 133 and optionally all or part of support block 119. The receiving member 137 may be an opening dimensioned to receive an attachment member such as that disclosed in reference to FIGS. 2A and 2B. It should be recognized that in some embodiments, one end of VIV suppression device 103 may include receiving member 137 and the other end includes attachment member 124. In other cases, one end of VIV suppression device 103 includes an attachment member 124 or receiving member 137.

Again referring to FIG. 2C, copper plate 133 acts as a bearing surface for an adjacent VIV suppression device and impedes marine growth on the bearing surface. Receiving member 137 is used to receive a male piece (e.g., attachment member 124) from an adjacent VIV suppression device. Receiving member 137 may be of a diameter approximately equal to the diameter of the corresponding male piece, or may be of a larger diameter than the corresponding male piece. By having a larger diameter than the corresponding male piece, the adjacent VIV suppression devices (e.g., fairings) are able to move some relative to each other. Receiving member 137 may be non-circular in cross section. Receiving member 137 may be sufficiently deep to allow full penetration of the corresponding male piece or may allow only partial penetration of the male piece. More than one receiving member 137 may be present and each opening may be identical or different from the other openings. Copper plate 133 may be of any suitable size or shape and any number of plate fasteners 135 may be used to attach it to support block 119. It is also recognized that materials other than copper may be used for the bearing plates (e.g., copper plate 125 and/or copper plate 133) whether or not that material has the ability to suppress marine growth, and it is recognized that the bearing plates do not even need to be present and instead the support blocks or other structures may be used to house the male piece and opening.

Figure 2D:
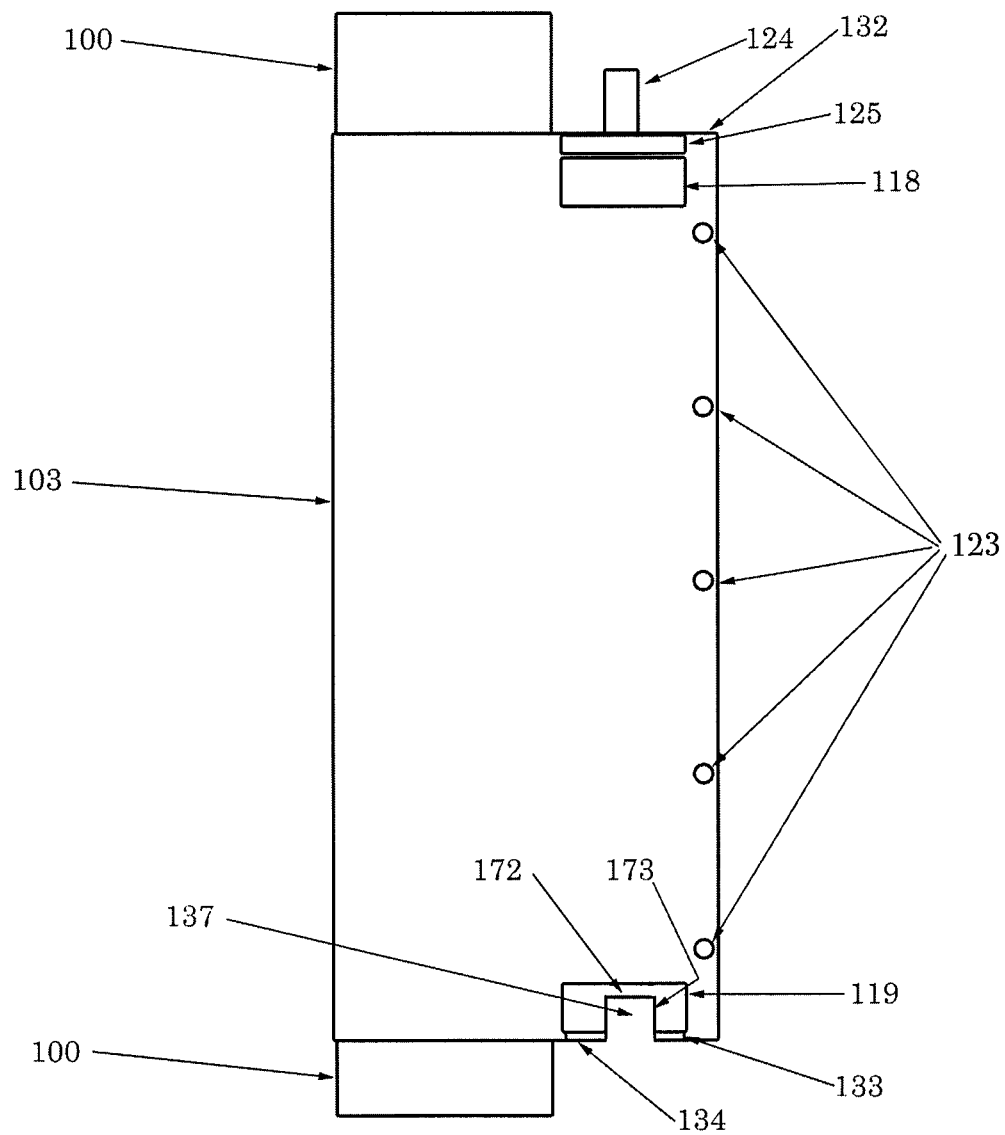
FIG. 2D illustrates a cross section of the VIV suppression device of FIG. 2B along line A-A'.

Referring now to FIG. 2D, FIG. 2D illustrates a cross sectional view of FIG. 2B, along line A-A'. From FIG. 2D it can be seen that VIV suppression device 103 is positioned around tubular 100 with support blocks 118 and 119, attachment member 124 at one end, copper plates 125 and 133, and receiving member 137 at another end. From this view, it can be seen that in one embodiment, receiving member 137 is a recessed region, pocket, channel or the like, formed inwardly from the bottom edge 134 of VIV suppression device 103. In this aspect, receiving member 137 may be defined by a bottom surface 172 and sidewalls 173 that extend from the bottom surface 172 and form an opening within which an attachment member 124 can be inserted, at the bottom edge of device 103. In addition, it can be seen that copper plates 125 and 133 are plates formed along the top and bottom edges of VIV suppression device 103.

Again referring now to FIG. 2D, from this view it can be seen that attachment member 124 extends upwards (e.g., parallel to a longitudinal axis of device 103) from the VIV suppression device 103, support block 118 and copper plate 125. Attachment member 124 may consist of a bolt, pin, stud, pipe, or other appurtenance. It may be attached to copper plate 125, support block 118, or both copper plate 125 and support block 118. Attachment member 124 may be integral to copper plate 125 and/or support block 118. It may be kept in place by interference, for example a bolt whose head is sandwiched between copper plate 125 and support block 118.

Still referring to FIG. 2D, while this figure shows a VIV suppression device (e.g., a fairing) with one attachment member 124 at one end and one receiving member 137 at another end, it is possible for the VIV suppression device to have all male pieces, all female pieces or any combination thereof. It is also possible for one end to have both male and female pieces for mating with an adjacent VIV suppression device. It is also possible for a VIV suppression device to have a single mating piece, for example a mating piece at one end and not the other.

Figure 3A:
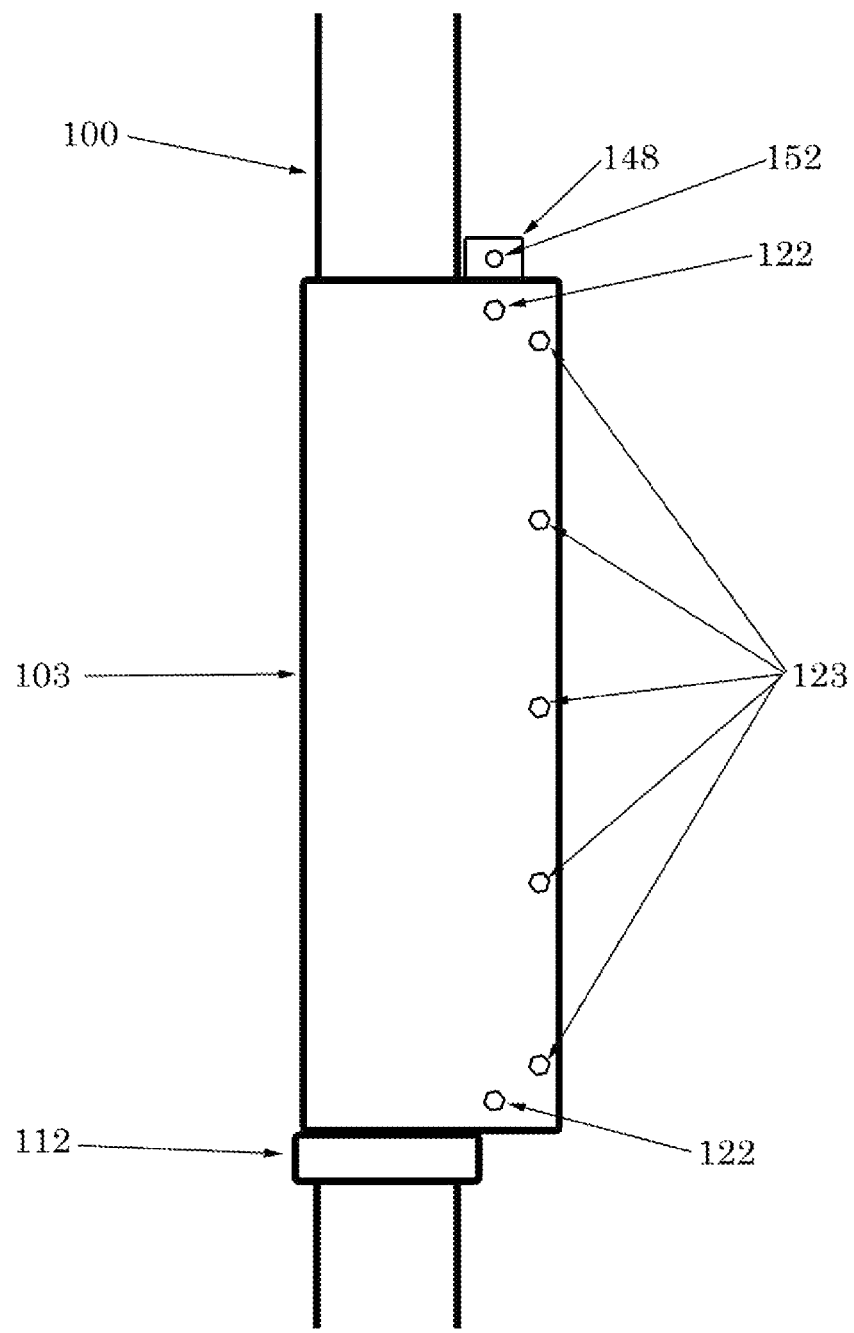
FIG. 3A illustrates a side view of one embodiment of a VIV suppression device utilizing a block for locking two adjacent VIV suppression devices together.

Referring now to FIG. 3A, FIG. 3A shows a side view of a VIV suppression device and a collar, for example VIV suppression device 103 and collar 112 described in reference to FIG. 1B, on tubular 100. Fasteners 123 attach VIV suppression device 103 to itself after it is placed around tubular 100. Block fasteners 122 attach VIV suppression device 103 to internal blocks.

Figure 3B:
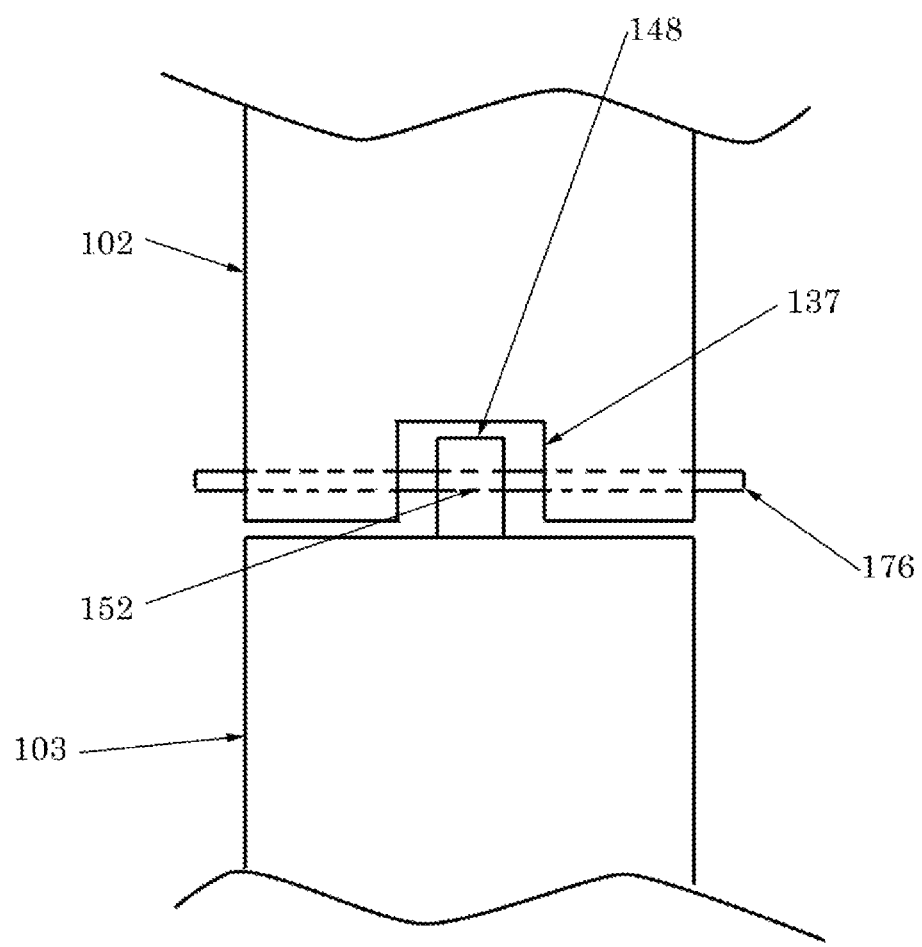
FIG. 3B illustrates a magnified front end view of the VIV suppression device of FIG. 3A utilizing a block for locking two adjacent VIV suppression devices together.

VIV suppression device 103 may further include a mating block 148 extending from a top end of device 103. Mating block 148 may be attached at one end to the end of device 103 by a top block fastener 122 and have an opening 152 at its other end. Mating block 148 may be used to attach VIV suppression device 103 to an adjacent VIV suppression device (such as a fairing) as shown in FIG. 3B. In particular, an adjacent VIV suppression device 102 having a receiving member 137 may be aligned with the mating block 148 as shown in FIG. 3B. A block fastener 176 may then be inserted through the adjacent VIV suppression device 102 and opening 152 within mating block 148 to fasten VIV suppression device 102 to VIV suppression device 103. In this aspect, opening 152 may be a laterally extending opening formed entirely through mating block 148 (e.g., from one side to the other).

Again referring to FIG. 3A and FIG. 3B, mating block 148 may be of any suitable size or shape and may have any number of attachment points. Any number of mating blocks 148 may be used and each block may be identical or different. While a block fastener 176 is described as being used to attach mating block 148 to VIV suppression device 102 and to attach mating block 148 to VIV suppression device 103, other attachment methods may also be used and mixed or matched including, but not limited to, pinning, welding, clamping, chemical bonding, or an interference fit. In addition, an external plate or block may be substituted for mating block 148 and any number may be used and they may be located at any place on VIV suppression device 103 that allows them to be used to attach an adjacent VIV suppression device (e.g., a fairing). Mating block 148 may be of any suitable material.

Figure 4:
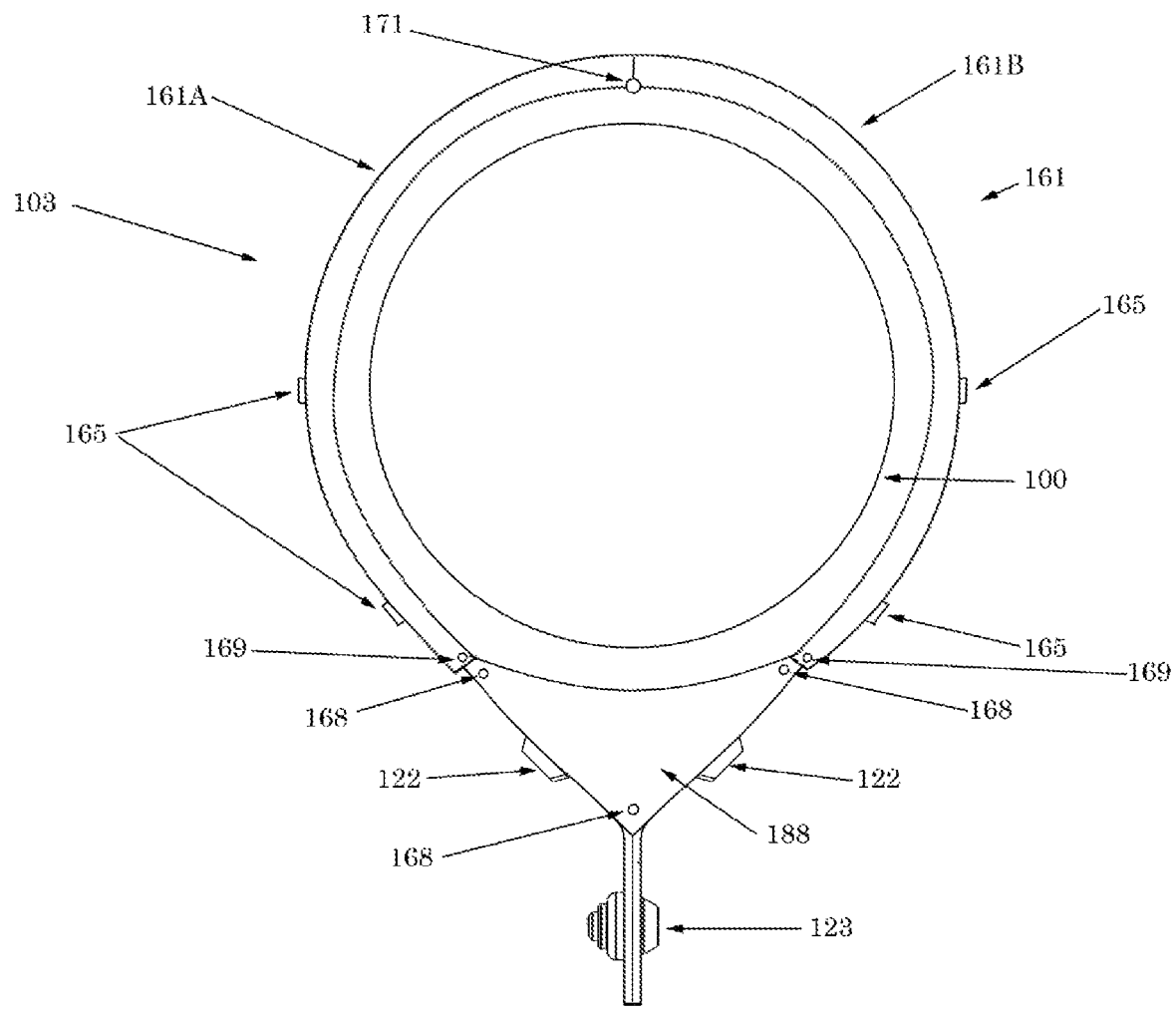
FIG. 4 illustrates a top end view of one embodiment of a VIV suppression device with copper on the VIV suppression device acting as a bearing surface.

Referring now to FIG. 4, VIV suppression device 103, for example a fairing, is shown surrounding tubular 100 and attached to itself by tail fastener 123. Block fasteners 122 attach VIV suppression device 103 to an internal block (generally recessed below copper plate 188). Copper plate 188 is attached to the internal block by plate fasteners 168. Copper ring 161 is attached to VIV suppression device 103 by ring fasteners 165 and copper ring 161 is split into two parts 161A and 161B at hinge 171. Copper ring 161 is also optionally attached to copper plate 188 by end fasteners 169.

Again referring to FIG. 4, copper ring 161 and copper plate 188 provide a bearing surface for VIV suppression device 103 that completely covers the end of VIV suppression device 103 so that none of VIV suppression device 103 is directly exposed to an adjacent collar or VIV suppression device. Copper ring 161 is shown extending over one or more sides of VIV suppression device 103, which utilizes ring fasteners 165 which go through the side of both copper ring 161 and VIV suppression device 103. In general, it will be desirable to have both copper ring 161 and copper plate 188 to be coplanar so that there is not a lip to catch on an adjacent VIV suppression device or collar.

Still referring to FIG. 4, copper ring 161 and copper plate 188 may be attached by any suitable method and may or may not be attached to each other. It is also possible for copper ring 161 and copper plate 188 to be a single piece or it is possible for them to be connected to each other and only one of them connected to VIV suppression device 103. Copper ring 161 and copper plate 188 may be of any suitable size or shape and they may also be made of other materials or made of more than one material. Ring fasteners 165 can be installed radially into the side of the VIV suppression device body or, if the VIV suppression device wall is sufficiently thick, they can be installed axially into the VIV suppression device wall.

Figure 5:
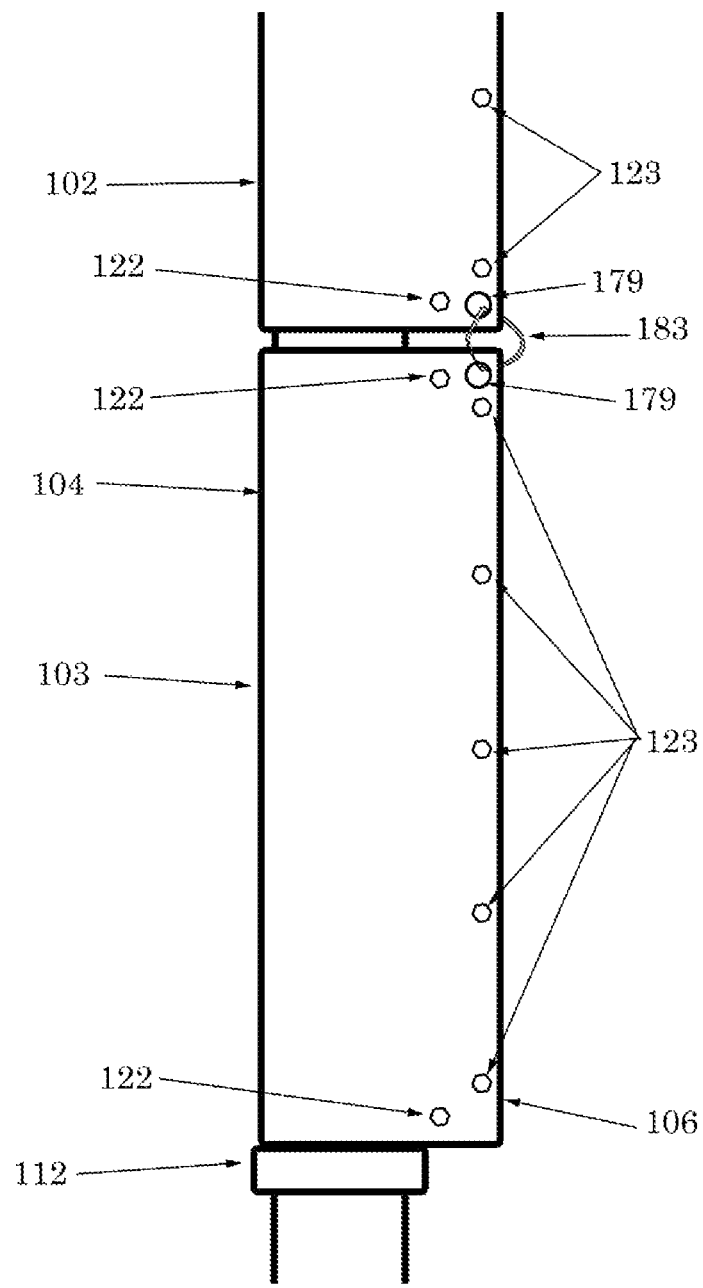
FIG. 5 illustrates a side view of one embodiment in which two VIV suppression devices are connected.

Referring now to FIG. 5, two VIV suppression devices, for example VIV suppression devices 102 and 103, are attached around the underlying tubular using tail fasteners 123 while collar 112 is clamped to the underlying tubular. Block fasteners 122 are used to attach internal support blocks to VIV suppression devices 102 and 103. Fastener channels or openings 179 are present in VIV suppression devices 102 and 103 and fastener 183 is used to connect VIV suppression devices 102 and 103 through fastener openings 179. The fastener channels or openings 179 may extend laterally through the tail portions 106 of VIV suppression devices 102 and 103. In other words, channels or openings 179 extend entirely through the tail portions 106, from side to the other, in a lateral, as opposed to axial, direction.

Again referring to FIG. 5, fastener 183 illustrates another method for connecting two adjacent VIV suppression devices together while providing the devices with a small range of motion. Fastener 183 may be a cable of any suitable size or shape and other structures may be used in its place including rope, clips, pins, and cable ties. Fastener 183 may be made of any suitable material including, but not limited to, plastic, metal, synthetic, and fiberglass. Fastener openings 179 may be of any size and shape and may be identical or different. Multiple fastener openings 179 and fasteners 183 may be used for a single connection. Fastener openings 179 and fasteners 183 may be located anywhere on the VIV suppression device body, for example they may be located near the nose of the VIV suppression device instead of the VIV suppression device tail shown in FIG. 4.

Figure 6:
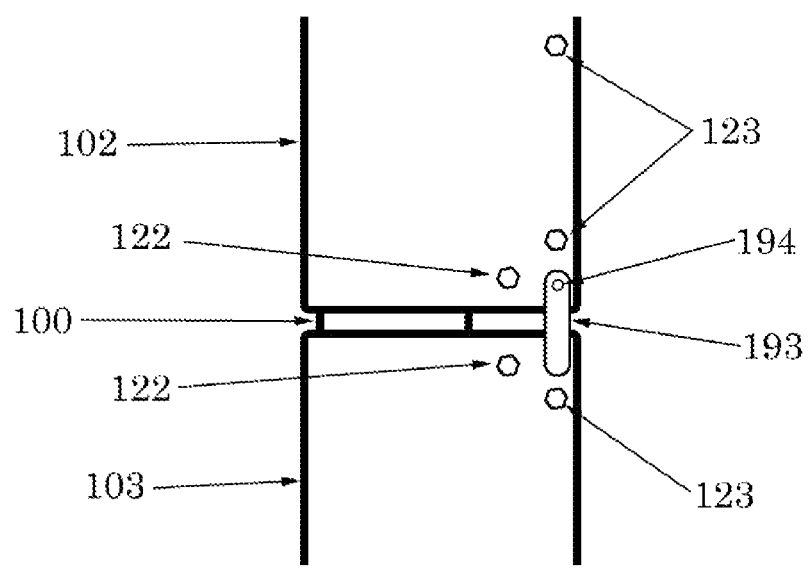
FIG. 6 illustrates a side view of another embodiment in which two adjacent VIV suppression devices are connected.

Referring now to FIG. 6, FIG. 6 illustrates a magnified side view of one embodiment of an interface between two VIV suppression devices. VIV suppression devices 102 and 103 are attached around the underlying tubular 100 using tail fasteners 123. Block fasteners 122 are used to attach internal support blocks to VIV suppression devices 102 and 103. Clip 193 is attached to VIV suppression device 102 by clip fastener 194.

Again referring to FIG. 6, clip 193 may include one or more elongated bar or pole like members that extend in an axial direction from VIV suppression device 103 outwards towards an adjacent VIV suppression device 102 and restricts the relative motion between the two devices. More than one clip 193 may be used, for example one clip may extend down the outside of an adjacent VIV suppression device on one side while another clip may extend down the outside of an adjacent VIV suppression device on the opposite side, thereby restricting its relative rotation in both directions. Clip 193 may be of any suitable size or shape. Clip 193 may be made of any suitable material including, but not limited to, metal (including copper), plastic, and rubber or elastomer. Clip 193 may be integral to VIV suppression device 102, VIV suppression device 103, or clip fastener 194. Clip 193 may consist of more than one member, and VIV suppressions device 103 may have a receiving member that interfaces with clip 193. Each component discussed herein may be mixed and match and may be identical or different.

The above aspects of this invention may be mixed and matched in any manner suitable to achieve the purposes of this invention. It is recognized that, while fairings have been used to illustrate the invention herein, the concepts presented may be applied to any VIV suppression device that allow for motion of the suppression devices. This includes splitter plates and other rotatable devices. It is also recognized that the ideas herein can be applied to other styles of fairings, but example one or more splitter plates, fairings without end blocks, and fairings where copper plates or other anti-fouling structures discussed herein are used for structural support. In broad embodiments, the present invention consists of methods for aligning and/or restraining or locking two adjacent fairings.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. For several of the ideas presented herein, one or more of the parts may be optional. The invention should therefore not be limited by the above described embodiment, method, and examples, but by all embodiments and methods within the scope and spirit of the invention.

What is claimed is:

1. A vortex-induced vibration (VIV) suppression system comprising:
   a first vortex-induced vibration device comprising:
      a body portion dimensioned to partially encircle an underlying tubular;
      a tail portion extending laterally outward from the body portion, the tail portion having a first side wall and a second side wall that are formed as a single piece with the body portion and extend from the body portion toward one another to form an enclosed space around an underlying tubular partially encircled by the body portion, and each of the first side wall and the second side wall having a top end and a bottom end;
      a block positioned within the enclosed space and attached to interfacing surfaces of the first side wall and the second side wall to secure the body portion and the tail portion to the underlying tubular; and
      a bar aligned with the enclosed space and extending from the block; and
   a second vortex-induced vibration device that is adjacent to the first vortex-induced vibration device, and the adjacent VIV suppression device comprises an opening for receiving the bar, and the opening has a cross-sectional dimension that is greater than that of the bar.

2. The VIV suppression device of claim 1 wherein the body portion and the tail portion are formed of a same material.

3. The VIV suppression device of claim 1 wherein the bar comprises a length dimension substantially parallel to a longitudinal axis of the body portion.

4. The VIV suppression device of claim 1 wherein the body portion and the first side wall and the second side wall of the tail portion are a single piece.

5. The VIV suppression device of claim 1 wherein the bar extends from the block above the top end of the first side wall or the second side wall, the device further comprising a recessed region formed inwardly from the opening in the bottom end of the first side wall or the second side wall.

6. The VIV suppression device of claim 5 wherein the recessed region comprises a bottom surface and a sidewall extending from the bottom surface to the bottom end of the first side wall and the second side wall to form an opening at the bottom end.

7. The VIV suppression device of claim 1 wherein the bar comprises a fastener that extends through a channel formed through the first side wall or the second side wall of the tail portion.

8. The VIV suppression device of claim 1 further comprising:
a copper plate formed along one of the top end or the bottom end of the first side wall or the second side wall of the tail portion.

9. The VIV suppression device of claim 1 wherein the bar is a bolt.

10. The VIV suppression device of claim 1 further comprising:
a copper plate attached to the support block.

11. A system for suppressing a vortex-induced vibration (VIV) of a tubular, the system comprising:
a VIV suppression device having a first side wall and a second side wall that taper toward one another and partially encircle an underlying tubular, and a fin extending from the first side wall or the second sidewall;
a bolt extending from, and fixedly attached to, a top end of the VIV suppression device; and
an opening formed through a portion of the first side wall or the second side wall at a bottom end of the VIV suppression device.

12. The system of claim 11 wherein the VIV suppression device is a tail fairing further comprising a cylindrical body portion dimensioned to encircle a remaining portion of the underlying tubular and the first side wall and the second side wall are attached to the body portion and extend laterally outward from the body portion.

13. The system of claim 11 wherein the opening is part of a recessed region having sides formed inwardly from the bottom end of the VIV suppression device to a closed bottom surface within the VIV suppression device, and, wherein the bolt is a first bolt dimensioned to engage with a first adjacent VIV suppression device, and the opening is dimensioned to engage with a second bolt coupled to a second adjacent VIV suppression device, and the opening is substantially larger than the second bolt of the second adjacent VIV suppression device such that the second bolt of the adjacent VIV suppression device is operable to be inserted within the opening without touching of the sides of the recessed region.

14. The system of claim 11 further comprising:
a support block positioned within the VIV suppression device near the top end, and wherein the bolt is fixedly mounted to the support block.

15. The system of claim 11 further comprising:
a plate positioned over the top end or the bottom end of the VIV suppression device, wherein the plate provides a bearing surface for an adjacent VIV suppression device.

16. The system of claim 11 further comprising:
a marine growth suppression plate positioned on the top end or the bottom end of the VIV suppression device.

17. The system of claim 11 further comprising:
a copper ring positioned on the top end or the bottom end of the VIV suppression device.

18. The system of claim 17 wherein the copper ring comprises a first ring section and a second ring section, and wherein the first ring section and the second ring section are movably attached together by a hinge.

19. A system for suppressing a vortex-induced vibration (VIV) of a tubular, the system comprising:
a VIV suppression device having a first side wall and a second side wall, the first side wall and the second side wall having interfacing surfaces that taper toward one another to form a substantially triangular shaped region against an underlying tubular;
at least one support member positioned within the triangular shaped region, and in contact with, the interfacing surfaces of the first side wall and the second side wall;
a copper plate attached to a top end of the VIV suppression device, wherein the copper plate comprises a triangular shape;
a first engaging member comprising a bolt fixedly attached to the at least one support member and extending above the copper plate of the VIV suppression device, wherein the bolt is dimensioned to directly engage with an adjacent VIV suppression device; and
a second engaging member positioned at the bottom end of the VIV suppression device, and
wherein the second engaging member is different than the bolt.

* * * * *